United States Patent Office 2,800,628
Patented July 23, 1957

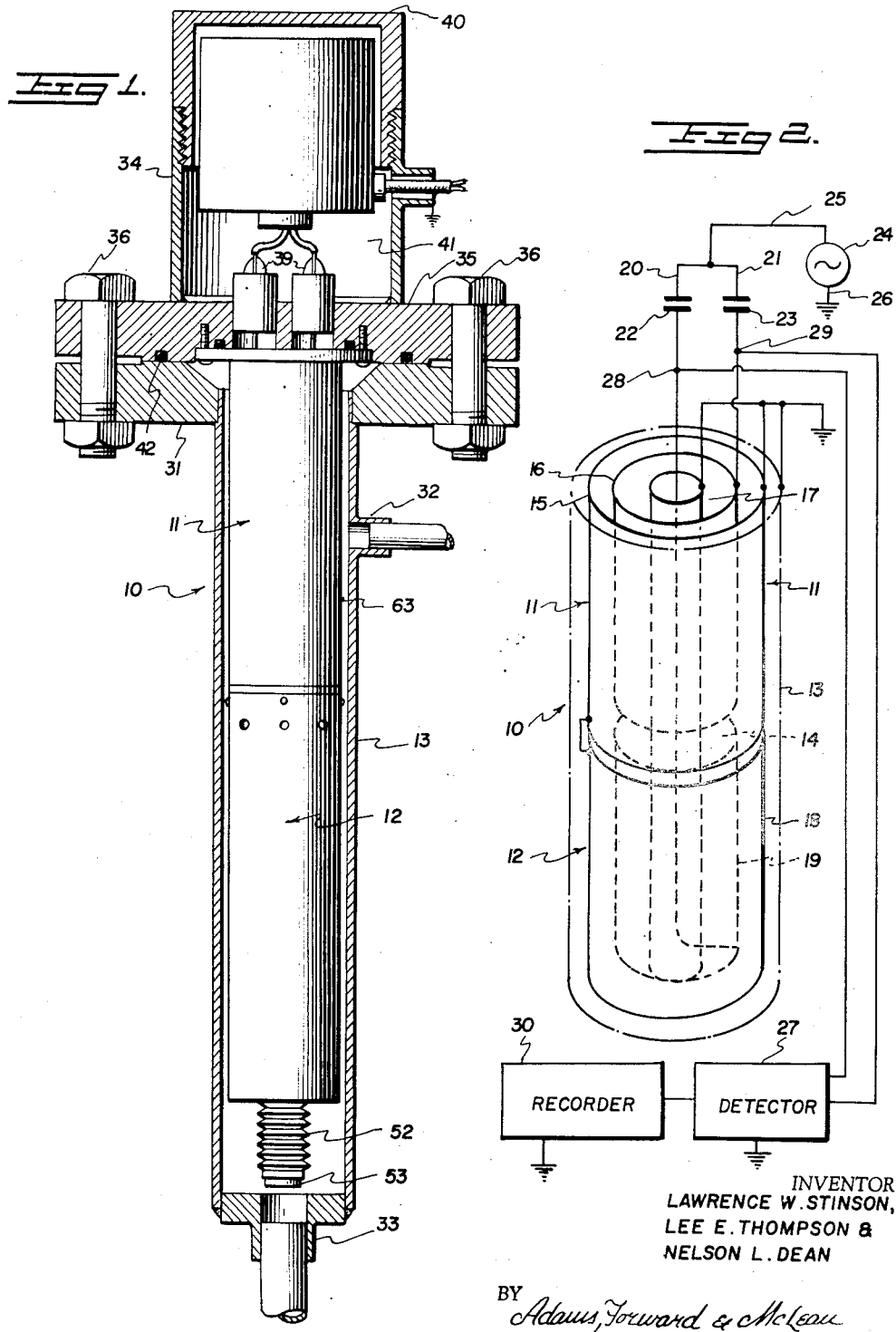

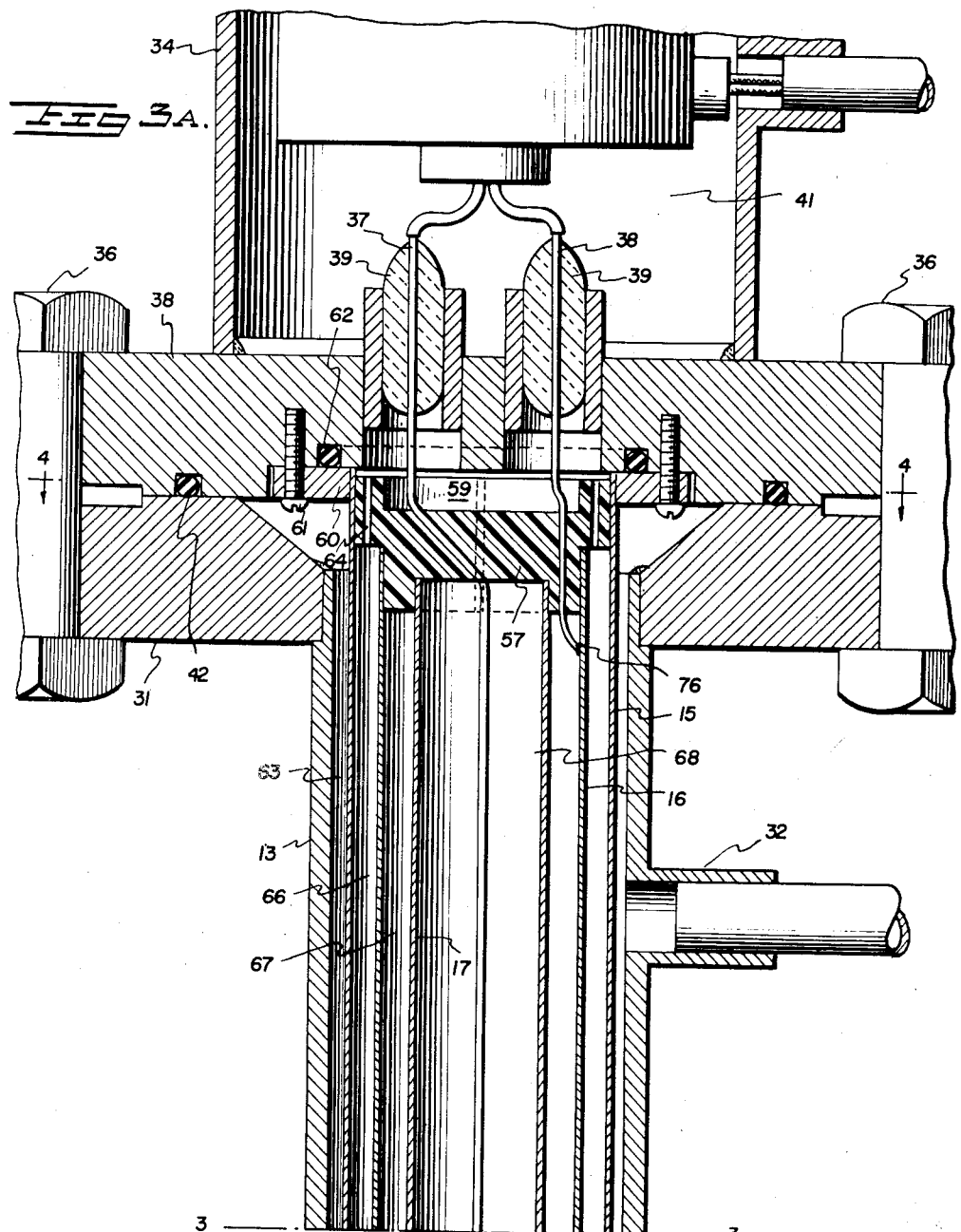

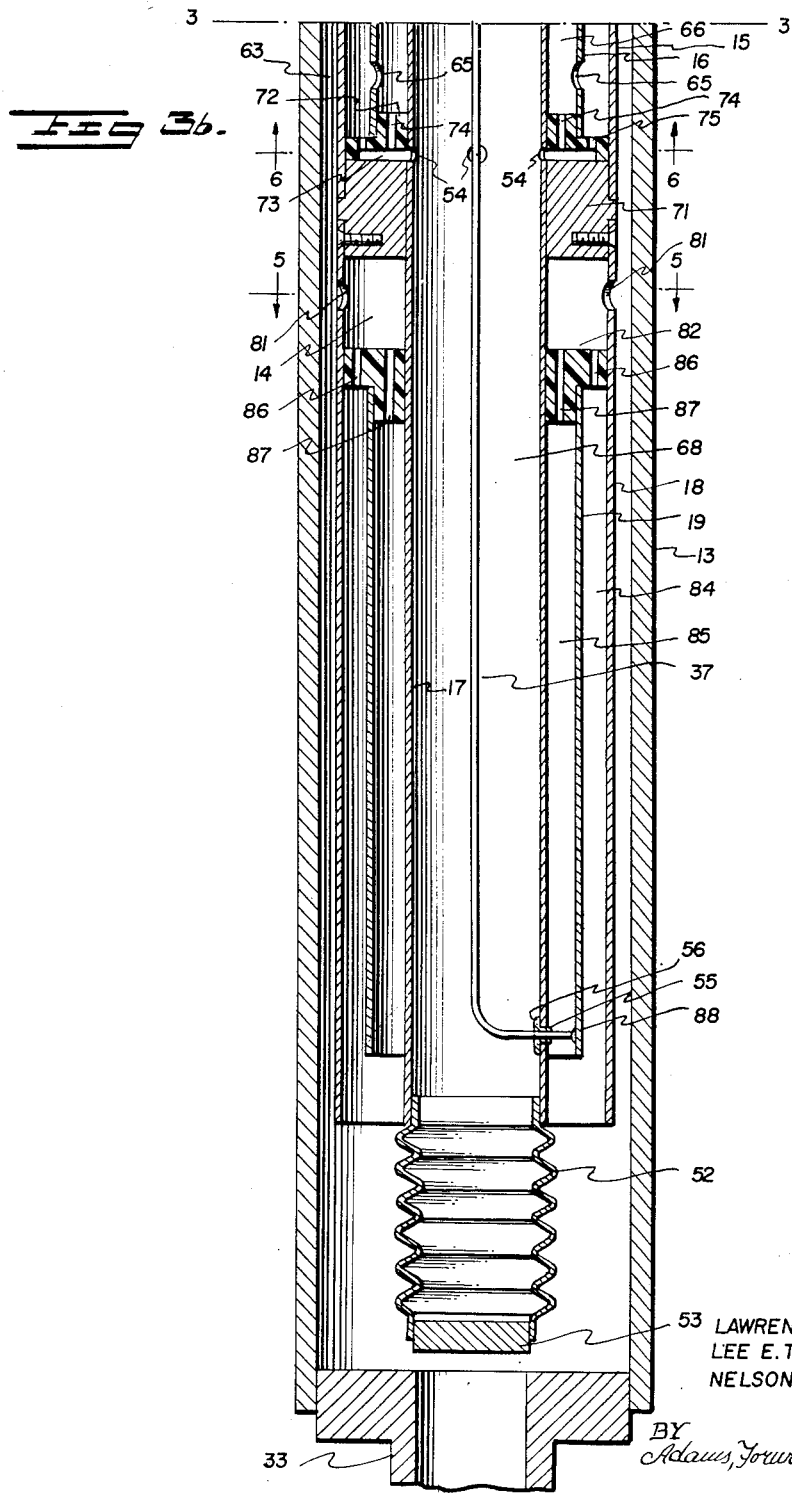

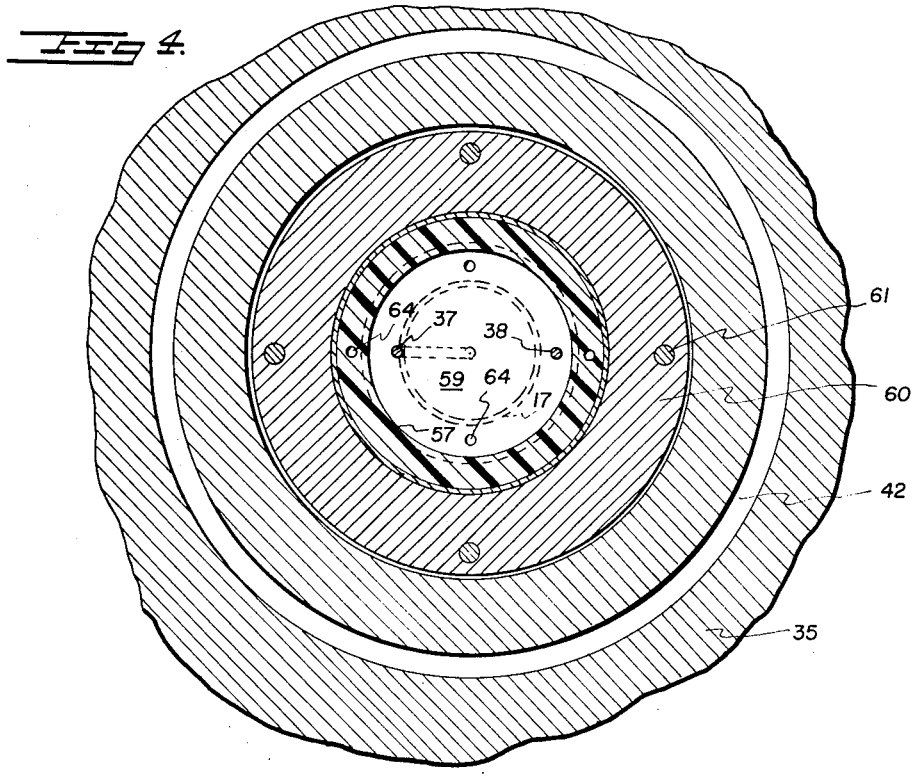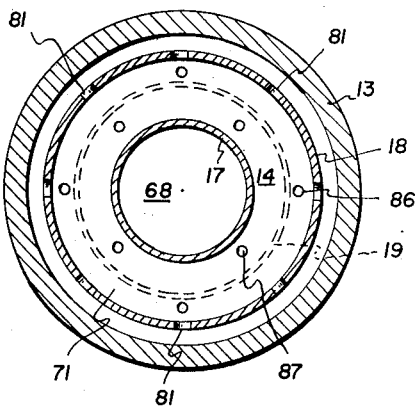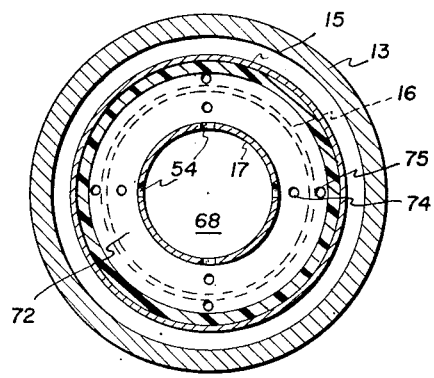

2,800,628
DUAL TESTING CAPACITOR

Lawrence W. Stinson, Lee E. Thompson, and Nelson L. Dean, Tulsa, Okla., assignors to Sinclair Research Laboratories, Inc.

Application December 18, 1953, Serial No. 399,064

3 Claims. (Cl. 324—61)

This invention relates to the measurement of the dielectric properties of flowing fluid streams and in particular provides a dual capacitor cell device which in connection with a capacitance measuring bridge circuit is suitable for the inspection and monitoring of flowing fluid streams such as hydrocarbons flowing in a petroleum products pipe line.

As is well known present-day operation of petroleum products pipe lines requires pumping successive cargoes of different petroleum products through a pipe line. It is also well known that at intermediate storage and terminal delivery points a serious problem is encountered by pipe line operators in the separation of the successive cargoes without undue waste or sloppage.

An advantageous method for monitoring and inspecting the flow in petroleum products pipe lines, particularly with regard to the detection of the passage of cargo interfaces, is described in copending application Serial No. 122,453 of John J. Piros, filed October 20, 1949, now abandoned. The Piros method contemplates continuous passage of a sample stream of the hydrocarbons through a cell which is connected in a circuit energized by constant and relatively high frequency alternating potential under conditions wherein the hydrocarbon sample stream functions as a dielectric medium for the cell. The character of the petroleum products flowing in the pipe line is then detected as a function of the dielectric constant of the sample stream as it passes through the cell by measuring the potential developed across the cell.

It has also been heretofore discovered that in carrying out dielectric constant detection methods for monitoring and inspecting the character of hydrocarbon products flowing in a petroleum products pipe line undesired effects of temperature and pressure upon the dielectric constant of the sample stream flowing through the cell can be corrected substantially by designing the capacitor cell as a dual capacitor cell unit which is connected in a capacitance bridge circuit including a first (sensing) cell through which the sample stream is passed and a second (reference) cell which contains a fluid of similar, although not necessarily identical, constitution to that of the sample stream. By maintaining the two cells in intimate thermal contact with the sample stream and by equalizing the pressure therebetween it will be seen that changes in the dielectric constant of the sampled fluid due to temperature or pressure variations which otherwise might effect spurious results and cause recording equipment to indicate a change of constitution of the sampled stream can be compensated to a great extent. Such a dual capacitor cell is described and claimed in copending application Serial No. 303,558 of Lawrence W. Stinson and Lee E. Thompson, filed August 9, 1952.

It is an object of this invention to provide a suitable dielectric sensitive cell for connection to a continuous sampling line from a petroleum products pipe line which when properly connected to appropriate energizing and detecting circuits will provide sensitive, instantaneous and accurate detection of the dielectric constant of the flowing hydrocarbon stream in the pipe line in accordance with the method described in the above noted Piros application.

It is a further object of this invention to provide a dual capacitor cell containing a sensing cell and a reference cell in intimate thermal and pressure relationship for connection to a petroleum products pipe line and for connection in a suitably energized capacitance measuring bridge which will provide accurate compensation for temperature and pressure changes of the flowing hydrocarbon stream in the manner described in the above noted Stinson and Thompson application.

It is a principal object of this invention to provide a dual capacitor cell which not only compensates for pressure and thermal effects in the measurement of the dielectric constant in a continuously flowing fluid stream but which is further capable of improved accuracy and sharpness in definition of changes in the character and constitution of the flowing fluid stream.

It is yet a further principal object of this invention to provide a dual capacitor cell device wherein compensation is provided to prevent inaccuracies of the measurements taken due to inability to provide the requisite substantially constant frequency of the applied alternating potential.

It is an object of this invention to prevent the presence of foreign particles in either cell which might detract from the sensitivity of the measurements made.

It is another object of this invention to provide a dual capacitor cell in which reference fluids can readily be removed and replaced without disassembling the device.

These and other objects of the invention which will be evident upon further description are obtained by employing vertically aligned sensing and reference cells which are enclosed within a common housing. The external walls of each cell are maintained at ground potential, and the main sample stream is passed through the unit in the annular space between the housing and the external walls of the two cells. A mixing chamber is interposed between the two cells and is provided with lateral inlets at right angles from the main sample stream and with vertical outlets into the sensing cell. The reference cell is provided with an elongated outlet at ground potential which opens in close proximity to the outlet opening of the common housing.

The described construction permits the incoming stream of hydrocarbons to flow around the external walls of both cells and thus maintain the reference fluid at the same temperature as the flowing sample fluid. Pressure equalization means of course is employed to equalize the pressure between the confined reference cell and the flowing stream. At the same time the mixing chamber interposed between the two cells eliminates back mixing of the sample stream as it passes through the sensing cell. Foreign particles entering the inlet to the housing pass through the device in the space between the housing and the grounded outer walls of the sensing and reference cells, being carried past the right angled inlets to the mixing chamber by momentum.

Figure 1 is a partially sectioned elevation of a dual capacitor cell of this invention;

Figure 2 is a diagrammatic view illustrating the electrical connection of a dual capacitor cell according to this invention;

Figure 3 (subdivided into Figures 3a and 3b by line 3—3) is a sectioned elevation of the dual capacitor cell illustrated in Figure 1;

Figure 4 is a fragmentary cross-section of the cell taken at line 4—4 of Figure 3a;

Figure 5 is a cross-section of the cell taken at line 5—5 of Figure 3b; and

Figure 6 is a cross-section of the cell taken at line 6—6 of Figure 3b.

In the drawings the reference numeral 10 indicates a dual capacitor cell constructed in accordance with the principles of this invention. Referring particularly to Figure 2 it will be seen that dual capacitor cell 10 includes vertically aligned reference cell 11 and sensing cell 12 retained within common housing 13 vertically separated by chamber 14.

Reference cell 11 includes two coaxially positioned vertical cylindrical electrodes 15 and 16 spaced in the upper portion of housing 13 coaxially positioned about the upper portion of cylindrical central electrode 17 which extends the full length of both cells. Similarly, sensing cell 12 includes a pair of vertically positioned electrodes 18 and 19 coaxially positioned and spaced within the lower end of housing 13 about the lower portion of electrode 17. Electrode 17 is common to both cells 11 and 12.

Housing 13, outer electrodes 15 and 18, and common electrode 17 are all electrically connected together and maintained at ground potential while electrodes 16 and 19 of the reference and sensing cells respectively are insulated from the remaining parts of the cells and housing. Cells 11 and 12 are electrically connected as adjacent legs of a capacitance measuring bridge which includes an opposite pair of adjacent legs 20 and 21. Legs 20 and 21 include impedances, such as capacitors 22 and 23, respectively. An alternating current generator such as an R. F. oscillator 24 has its output connected between the common connection of bridge legs 20 and 21 and ground potential by leads 25 and 26, respectively. A suitable detector 27 is employed to determine the balance or lack of balance existing in the bridge circuit between junction 28 between leg 20 and sensing cell 12 and junction 29 between leg 21 and reference cell 11. Detector 27 which can, and usually will, include a rectifier or rectifiers is employed to drive recording instrument 30, such as a recording voltmeter, or suitable means for operating valves to shift the output flow of the pipe line (not shown) from one delivery line ot another in response to changes of electrical balance between the reference and sensing cell circuits representative of a change of the dielectric constant of the material flowing through the sensing cell.

The preceding description is made with particular reference to Figure 2 and is intended to illustrate the electrical connection of the dual capacitor cell circuit in accordance with the principles of our invention. Such electrical connection can be identical with that disclosed in co-pending application Serial No. 303,558 referred to above and forms no part of the present invention. Any suitable electrical arrangement for applying a regulated alternating current across reference cell 11 and sensing cell 12 which is connected by suitable detectors to measure the potential differential between cells 11 and 12 or the lack thereof can be used.

Referring specifically to Figures 1, 3a and 3b, 4, 5 and 6, the dual capacitor cell 10 of this invention includes an elongated stainless steel housing 13 to one end of which a peripherally extending flange 31 is welded. An inlet connection 32 is positioned on tube 13 near flange 31. The opposite end of tube 13 is provided with a suitable outlet connection 33. Connections 32 and 33 are adapted to receive fluid conductors, such as pipes for example, in threaded engagement.

Inlet 32 is connected by a suitable valved connection (not shown) to a petroleum products pipe line (not shown) so that a regulated sample stream can be withdrawn from the pipe line and passed into housing 13 through inlet 32. Outlet 33 is suitably connected to permit continuous withdrawal of fluids entering housing 13 through inlet 32. These fluids can be discharged, by repressuring, into the products pipe line at a point downstream from which they are withdrawn or they can be collected in a suitable receptacle (not shown) in order to permit further identification of the products, for example by flash point, vapor pressure and the like, to provide a correlation with dielectric constant measurements provided by the electrical circuit utilizing cell 10. For these purposes the outlet connection 33 can be valved to provide collection of particular portions of the fluid stream passing through housing 13 correlated with occurrence of a change in the dielectric constant of the measured sample.

Housing 13 is closed at its upper flanged end 31 by a head 34. End plate 35 welded to head 34 is secured by bolts 36 to flange 31 of housing 13, with a fluidtight seal provided by gasket 42. Plate 35 is provided with a pair of insulated feed-through bushings 39. In the illustrated case, each bushing 39 fits in a sleeve welded in position in a hole passing through plate 35. A conductor 37 passes through one such bushing 39 and a second conductor 38 passes through the other bushing 39. Head 34 is provided with a threadedly engaged cap 40 to provide an enclosed chamber 41 above housing 13 in which portions of the associated electrical circuits can be positioned. These can include condensers 22 and 23 and the rectifying circuits of detector 27 as well as other associated equipment thus reducing to a bare minimum the number of electrical connections which must be made to dual capacitor unit 10. The particular equipment and the choice of electrical connections located in head 34, however, form no part of the present invention.

Referring more specifically to Figure 3a and its continuation Figure 3b, the interior of housing 13 is provided with a number of coaxially positioned cylindrical electrode elements which in combination with partitions and supporting members define vertically aligned cells 11 and 12 separated by mixing chamber 14.

An elongated, hollow open-ended cylinder 17 extends substantially the length of housing 13 and is coaxially positioned therein. Cylinder 17 at its lower end near outlet 33 is provided with a flexible bellows extension 52 welded to cylinder 17 and closed at its lower end by plug 53. Plug 53 can be removed to open the end of cylinder 17 and is accessible for such an operation through outlet 33. Cylinder 17, bellows 52 and bellows plug 53 are formed of an electrical conductor material. Suitably cylinder 17 is made of stainless steel, and bellows 52 and plug 53 are made of brass or similar alloy.

Intermediate the length of cylinder 17 are a plurality of small ports 54, the positioning of which will be defined with reference to the location of the other parts of the internal structure of cell 10 described hereinafter. Near the lower end of cylinder 17 an additional port 55 is located. Conductor 37 referred to above passes centrally of the length of cylinder 17 and then passes through port 55 insulated therefrom by a sealed feed-through insulating bushing 56. Cylinder 17 is supported in housing 13 by an insulated support member 57 located in the upper end of housing 13 which will be described in greater detail hereinafter.

Cylinder 15 is mechanically mounted and electrically connected to plate 35 by means of annular retaining ring 60, screws 61 and gasket 62. Cylinder 15 depends coaxially within housing 13 just less than half the length thereof. Cylinder 15 is spaced quite close to the walls of housing 13 leaving sufficient clearance, however, to permit the sample stream to pass through the annular space 63 between housing 13 and cylinder 15 without increasing the velocity of the sample stream to a point of turbulent flow.

Partition insulator support 57 referred to above is positioned tightly within the upper end of cylinder 15. Support 57 is recessed in its upper surface to define a chamber 59 with the undersurface of plate 35 sealed from the rest of the interior of housing 13 as before noted by retaining ring 60 and gasket 62. Conductors 37 and 38, passing through feed-through bushings 39, extend through space 59 and through insulator 57 in a manner which will be described more fully hereinafter. The lower surface of insulator 57 is provided with an annular boss and a central recess, the central recess receiving and supporting cylinder 17.

Cylinder 16 is supported about the boss on the undersurface of insulator 57 in a position such that it depends downwardly within housing 13 coaxially positioned between cylinders 17 and 15 for a distance just short of the distance which cylinder 15 extends. The lower end of cylinder 16 is provided with a plurality of ports 65 which provide communication between the annular space 66 between cylinders 15 and 16 and the annular space 67 between cylinders 17 and 16.

Insulator 57 is provided with ports 64 to communicate chamber 66 with chamber 59 between plate 35 and support 57 and to communicate chamber 59 with chamber 68 within cylinder 17.

The lower end of cylinder 15 is fixed to annular partition 71 which seals off chambers 66 and 67 and which receives cylinder 17 in fluidtight engagement. Partition 71, like cylinders 15, 16 and 17, and plate 35, retaining ring 60 and housing 13, is made of an electrically conductive material such as stainless steel.

A second insulator support 72 is positioned above partition 71. Support 72, like partition 71, is an annular member and tightly receives cylinder 17 through its center and cylinder 15 about its periphery. A boss on the upper side of support 72 is provided to support cylinder 16. The underside of insulator 72 is recessed to define a small annular chamber 73 between insulator support 72 and partition 71. Ports 54 in cylinder 17, referred to above, are positioned to communicate the interior 68 of cylinder 17 with chamber 73. Vertical ports 74 in support 72 communicate chamber 73 with chamber 67 and a second set of vertical ports 75 communicate chamber 73 with chamber 66.

Thus it will be seen that when chambers 59, 66, 67, 68 and 73 are filled with a dielectric medium such as a hydrocarbon they form closed reference cell 11 having two electrodes insulated from each other. One electrode is formed by cylinders 15 and 17 having their common connection through partition 71 while the second electrode is formed by cylinder 16 which is supported at its ends by insulators 57 and 72. Since external cylinder 15 is grounded to housing 13 by means of its tight mechanical and electrical connection with retaining ring 60 and plate 35 only one internal electrical connection is required to utilize cell 11. This connection is made by bringing conductor 38 through space 59 and through a passage in insulator 57 into connection with cylinder 16 as at soldered junction 76 shown in Figure 3a. It will be further noted that the cell so defined will be maintained at substantially the temperature and pressure of any fluid flowing through housing 13 since the inlet stream from inlet 32 passes about cylinder 15 in intimate thermal contact therewith and since bellows 52 will equalize the pressures between the fluid confined within cell 11 and the interior of housing 13.

Sensing cell 12 together with the mixing chamber 14 are enclosed by cylindrical element 18 which is supported coaxially about cylinder 17 as an aligned extension of upper cylinder 15. Cylinder 18 encloses substantially the remainder of cylinder 17 with the exception of bellows end extension 52. Cylinder 18 is somewhat longer in length than cylinder 15 for reasons which will become apparent later.

At its upper end cylinder 18 is provided with ports 81 connecting mixing chamber 14 with annular space 63 between the inner wall of housing 13 and cylinders 15 and 18.

Immediately below ports 81 mixing chamber 14 is closed off by annular insulated support and spacer element 82 which tightly fits in cylinder 18 near its upper end and tightly about cylinder 17 near its mid-portion. The underside of annular spacer 82 is provided with a boss to provide tight fitting support for a cylinder 19 having identical dimensions to cylinder 16 in both length, thickness and diameter.

Cylinder 19 depends downwardly from the boss on spacer 82 coaxially within cylinder 18, ending however a short distance above the lower end of cylinder 18. It will be seen that cylinders 17, 18 and 19 define a pair of annular chambers, chamber 84 between cylinders 18 and 19, and chamber 85 between cylinders 17 and 19, which chambers constitute sensing cell 12. A plurality of ports 86 in spacer 82 communicate chambers 14 and 84 and a plurality of ports 87 communicate chambers 14 and 85. Conductor 37 which passes downwardly through the center of chamber 68 within the interior of cylinder 17, as before noted, extends through insulated bushing 56 at the lower end of cylinder 17. Conductor 37 is then connected with a soldered joint 88 to the lower end of cylinder 19. Cylinders 18 and 19, like other electrically conductive parts of the device, are suitably made of stainless steel or other material resistant to corrosive qualities of petroleum hydrocarbons which are to be measured in cell 10.

From the above description it will be seen that housing 13 contains a pair of vertically aligned cells, 11 and 12, each having grounded external walls and having an insulated electrode. It will be further seen that insulated electrodes 16 and 19 are of substantially identical physical and electrical characteristics, and that the two cells are physically separated by a mixing chamber 14 which communicates the sensing cell with the annular space between the housing walls and both cells.

The construction of the sensing cell and reference cell in identical physical manner as well as electrical manner thus afforded by the arrangement of the present invention in contradistinction to the arrangements of the prior art hereinabove referred to provides a compensation for frequency drift of oscillator 24 which has not been heretofore attained. Of course, if the dielectric constant of the sample stream differs greatly from the dielectric constant of the material placed in the reference cell, there will occur some inaccuracy of measurement as the oscillator frequency varies substantially. The structure of the cell however will provide more than adequate assurance of substantial independence of the frequency drift normally expected of a stable oscillator when the reference cell is filled with a fluid of similar electrical properties to those of the fluids being sampled.

The dual capacitor cell of the present invention, of course, maintains the dielectric medium placed in the reference cell at the same temperature and pressure as the fluid passing through the sensing cell. It is recognized that this feature per se is old and is shown for example in copending application Serial No. 303,558 noted above. The present dual capacitor cell however differs from that of the above noted prior case in that the present cell provides vertical alignment of the two cells separated by a mixing space and in that the present cell structure as above noted permits identical construction of the two cells. The present cell also offers other advantages since it permits a greatly enlarged area of thermal contact between the liquid maintained in the reference cell with the sample fluid stream. This enlarged contact is brought about by extending central electrode 17 through the length of the housing in a manner which does not affect the electric or physical characteristics of the reference and sensing cells since the central electrode is maintained grounded to the housing. At the same time, the extension of the central electrode facilitates positioning of an outlet to the reference cell within the vicinity of and easily accessible through the outlet 33 of housing 13. Thus the reference fluid contained within reference cell 11 can readily be changed without dismantling the apparatus simply by removing the connection to outlet 33 and opening the interior of reference cell 11 by removing plug 53 on bellows extension 52 of cylinder 17. The arrangement of ports in insulator 57, best shown in Figure 4, and the ports 54, 65, 74 and 75 at the lower end of the main reference cell facilitates purging of the reference cell and filling it without entrapping any air.

We claim:

1. A dual capacitor cell device for comparing the dielectric properties of a flowing stream of a fluid with the dielectric properties of a reference fluid which comprises a housing, means for introducing a flowing stream of fluid into said housing at one end, means for withdrawing fluid from said housing at the opposite end thereof, a reference cell defining a closed chamber having grounded external walls, a sensing cell having grounded external walls, said cells being situated in vertical alignment within said housing, means defining a mixing chamber disposed in said housing separating said reference cell and said sensing cell, means connected to said mixing chamber for passing fluid in said housing through said sensing cell, a pair of identical electrodes, one positioned in said reference cell and insulated therefrom and the other identically positioned in said sensing cell and insulated therefrom and means for equalizing the pressure of a fluid in said reference cell with the pressure of a fluid in said sensing cell.

2. A dual capacitor cell device according to claim 1 further comprising a common grounded electrode passing centrally through said reference cell, said mixing chamber and said sensing cell, said common electrode defining a closed chamber in communication with said reference cell and accessible at one end through said means for withdrawing fluid from said housing.

3. A dual capacitor cell device for comparing the dielectric properties of a flowing stream of fluid with the dielectric properties of a reference fluid which comprises an elongated cylindrical housing having an inlet adjacent one end and having an outlet at the opposite end, a hollow cylindrical central electrode coaxially mounted within the housing and electrically connected thereto, a first pair of cylindrical electrodes coaxially mounted within the housing about a portion of the central electrode adjacent the inlet end of the housing, said pair of cylinders being spaced apart from each other and from the housing and central electrode, a second pair of cylindrical electrodes coaxially mounted within the housing about a portion of the central electrode adjacent the outlet end of the housing and vertically aligned with said first pair of cylindrical electrodes, the external electrode of each pair of electrodes being electrically connected to said housing and the inner electrode of each pair being identical and being insulated from said housing, means defining a fluid tight chamber enclosing the interior of said central electrode with the annular spaces between said central electrode and said first pair of electrodes, means defining an annular mixing chamber about the middle portion of said central electrode in communication with the annular space between said housing and said external electrodes and in open communication with the annular spaces between said second pair of electrodes and said central electrode, and means for equalizing the pressure of a fluid confined within the said fluid tight chamber with the pressure of a fluid flowing through said housing between said inlet and said outlet.

References Cited in the file of this patent

UNITED STATES PATENTS

| 2,599,583 | Robinson et al. | June 10, 1952 |

FOREIGN PATENTS

| 506,921 | Great Britain | June 6, 1939 |